(No Model.) 2 Sheets—Sheet 1.

A. G. BARTON.
BAGGAGE TRUCK.

No. 538,060. Patented Apr. 23, 1895.

Witnesses

Inventor
Albert G. Barton
By G. W. Balloch
Attorney (No Model.) 2 Sheets—Sheet 2.

A. G. BARTON.
BAGGAGE TRUCK.

No. 538,060. Patented Apr. 23, 1895.

Witnesses

Inventor
Albert G. Barton
By G. W. Balloch
Attorney

UNITED STATES PATENT OFFICE.

ALBERT G. BARTON, OF THREE RIVERS, MICHIGAN.

BAGGAGE-TRUCK.

SPECIFICATION forming part of Letters Patent No. 538,060, dated April 23, 1895.

Application filed December 21, 1894. Serial No. 532,541. (No model.)

*To all whom it may concern:*

Be it known that I, ALBERT G. BARTON, a citizen of the United States, residing at Three Rivers, in the county of St. Joseph and State of Michigan, have invented certain new and useful Improvements in Baggage-Trucks; and I do hereby declare the following to be a full, clear, and exact description of the invention, such as will enable others skilled in the art to which it appertains to make and use the same.

My invention relates to certain novel and useful improvements in trucks of that class for handling baggage or freight, especially in transferring it from railway cars or from the truck to the cars, and it has for its object to effect the adjustment of the truck to any desired height, to accommodate cars of various heights whereby the baggage or freight can be delivered direct from the bed of the car upon the truck, or from the truck directly to the bed of the car.

Figure 1:
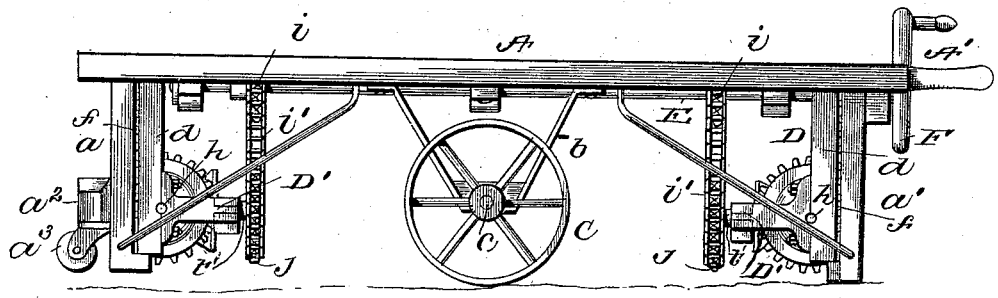
Figure 2:
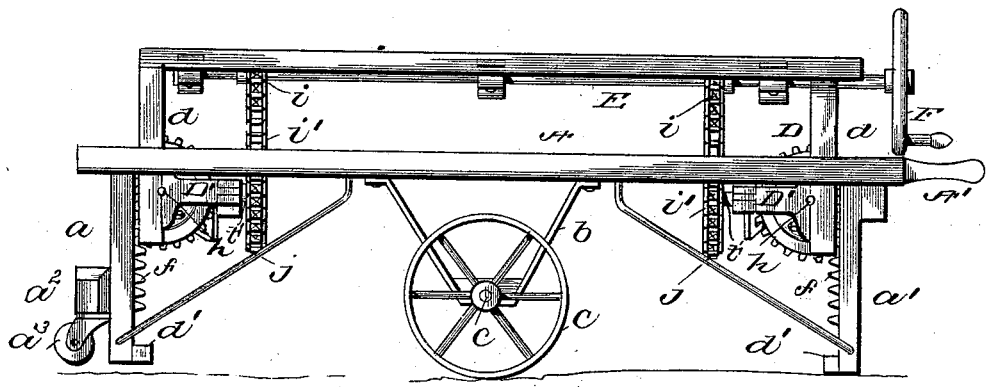
Figure 4:
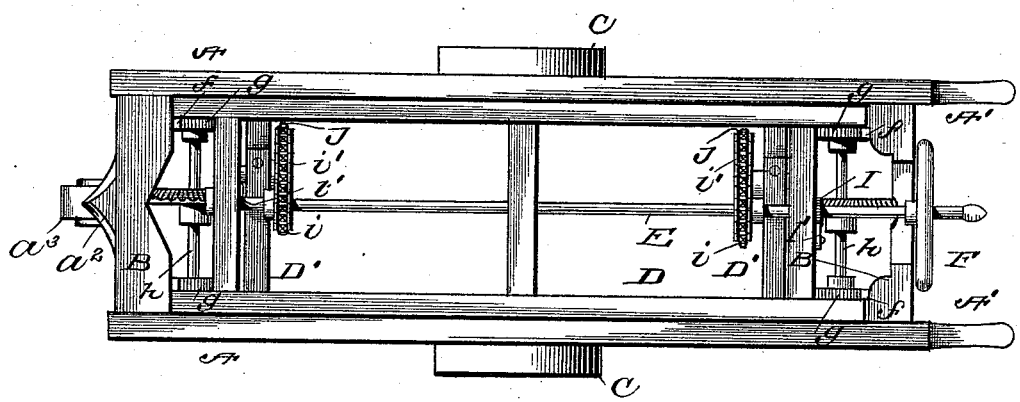
Figure 3:
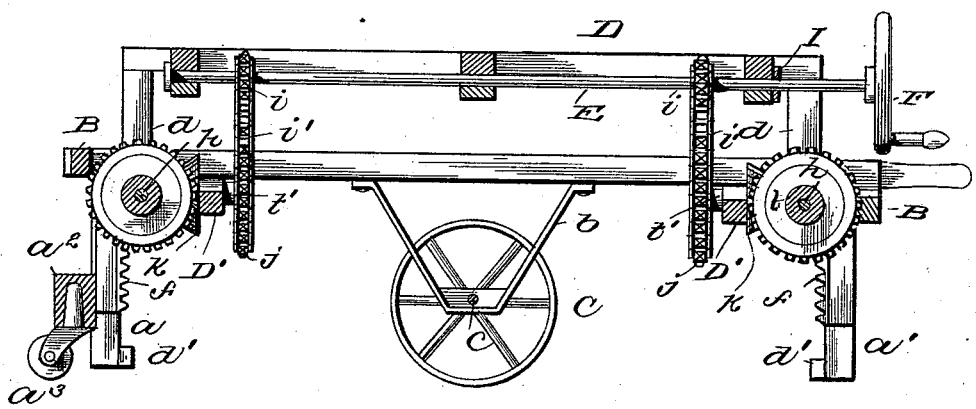

In the accompanying drawings—Figure 1 is a perspective view of my improved truck. Fig. 2 is a similar view of the same, with its auxiliary bearing frame or portion elevated. Fig. 3 is a central, longitudinal section thereof. Fig. 4 is a top plan view.

A, A, are longitudinal parallel bars, provided with handles, A' A', and connected together by transverse bars, B, B, one arranged near the handles, and the other near, or at, the forward ends of the bars A. A. These parts, taken together with the front and rear legs $a$, $a$, $a'$ $a'$ constitute the main frame of the truck.

About midway of the bars A. A. are secured pendent supports or brackets $b$. $b$, in the lower portions of which is journaled a transverse shaft $c$, bearing transporting wheels C, C, upon which the truck may be practically balanced.

To the front legs $a$, $a$, is secured a cross bar $a^2$, forming a bearing for a centrally arranged caster-wheel $a^3$ for the support of that end of the truck.

D. is the auxiliary, vertically-adjustable bearing-frame, arranged to fit, and move, within the main frame. This auxiliary frame is provided with four vertical pendent bars $d$, which are guided by the legs, $a$ $a'$ and the cross bars B, B, and provided with horizontal frames or arms D'. D', at or near their lower ends, said bars $d$ being limited in their downward movement by stops $d'$ preferably integral with the legs $a$, $a'$. Now my object is to adjust this auxiliary frame vertically so that the top bars thereof can be brought about on a level with the bed or floor of the car. This I do in the following manner: Toothed, or rack bars, or plates $f$, are fixed to the four legs of the truck; and with these racks are engaged pinions or toothed wheels $g$, keyed on horizontal transverse shafts $h$, carried by the frames or arms D'.

A longitudinal shaft E, has its bearings in suitable boxes secured to the transbeams of the auxiliary frame D. This shaft has keyed on its front end a balance handle-wheel F, in a convenient position for the attendant at the arms A'. It has also keyed on it chain wheels $i$—$i$— around which pass endless chains $i'$— $i'$— engaging similar chain or sprocket wheels $j$. $j$. having their shafts $t'$ $t'$ journaled on the frame D'. On the same shafts, $t'$ $t'$ are also beveled pinions or gears $k$, meshing with larger beveled pinions or gears $l$ keyed on the shafts $h$, $h$, having the pinions $g$ gearing with the racks $f$, of the main frame. A ratchet I, is secured on the shaft E. engaged by a pawl I', hung on a cross bar of the frame D, to hold positively the vertically movable frame at any desired height.

From the foregoing it will be seen that I combine with a portable baggage truck a vertically adjustable frame adapted to receive freight from, and about on the level with the floor of, a baggage car, thereby obviating the throwing of the trunks or baggage from a car to a platform.

Having thus described my invention, what I claim as new, and desire to secure by Letters Patent, is—

The combination of the transporting or supporting frame having legs provided with racks, the supplemental frame arranged within the aforesaid frame, the longitudinal shaft mounted upon said supplemental frame and extending from end to end thereof and provided with means for its rotation and with sprocket or chain wheels, the shafts mounted in pendants of said supplemental frame and provided with pinions engaging said racks and beveled gear-wheels meshing with corresponding pinions secured on shafts carrying also sprocket or chain wheels, and endless chain belts compassing the aforesaid sprocket wheels of the first and last named shafts, substantially as set forth.

In testimony whereof I affix my signature in presence of two witnesses.

ALBERT G. BARTON.

Witnesses:
JOHN B. TAYLOR,
J. J. CARBERY.